United States Patent
Herman et al.

(10) Patent No.: US 11,134,617 B2
(45) Date of Patent: Oct. 5, 2021

(54) SELF-GUIDED BLOSSOM PICKING DEVICE

(71) Applicant: CARNEGIE MELLON UNIVERSITY, Pittsburgh, PA (US)

(72) Inventors: Herman Herman, Gibsonia, PA (US); Christopher Chandler Fromme, Sycamore, PA (US); Elliot Allen Cuzzillo, Pittsburgh, PA (US); Jaime W. Bourne, Pittsburgh, PA (US); Richard D. Pantaleo, Monongahela, PA (US); Neil Frederick Stegall, Pittsburgh, PA (US); James Andrew Bagnell, Pittsburgh, PA (US); Jeffrey David McMahill, Wexford, PA (US); Joan Campoy, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 316 days.

(21) Appl. No.: 15/761,194

(22) PCT Filed: Sep. 19, 2016

(86) PCT No.: PCT/US2016/052528
§ 371 (c)(1),
(2) Date: Mar. 19, 2018

(87) PCT Pub. No.: WO2017/049304
PCT Pub. Date: Mar. 23, 2017

(65) Prior Publication Data
US 2018/0263188 A1 Sep. 20, 2018

Related U.S. Application Data

(60) Provisional application No. 62/220,482, filed on Sep. 18, 2015.

(51) Int. Cl.
*A01G 3/00* (2006.01)
*A01D 46/30* (2006.01)
(Continued)

(52) U.S. Cl.
CPC .............. *A01G 3/00* (2013.01); *A01D 46/005* (2013.01); *A01D 46/253* (2013.01); *A01D 46/30* (2013.01);
(Continued)

(58) Field of Classification Search
CPC ...... A01D 46/30; A01D 46/24; A01D 46/253; A01D 46/005; A01G 3/00
See application file for complete search history.

(56) References Cited

U.S. PATENT DOCUMENTS 3,756,001 A * 9/1973 Macidull .............. A01D 46/005
56/328.1
4,519,193 A 5/1985 Yoshida et al.
(Continued)

FOREIGN PATENT DOCUMENTS

EP 1891852 B1 2/2008

OTHER PUBLICATIONS

European Search Report for European Application EP16847556.4 dated Apr. 18, 2019.
(Continued)

*Primary Examiner* — Alicia Torres
(74) *Attorney, Agent, or Firm* — Michael G. Mónyok

(57) ABSTRACT

A self-guided blossom picker uses a vision system to identify and locate blossoms or inflorescence growing on a plant. The device can be towed by a tractor or it can be self-propelled. Image data captured by the vision system is sent to an machine vision module, which interprets the data and identifies a location of blossom. A controller uses the loca-
(Continued)

tion data to command a picker to the proper location. A cutter on the picker is actuated to remove the blossom.

18 Claims, 22 Drawing Sheets

(51) Int. Cl.
*A01D 46/253* (2006.01)
*A01D 46/00* (2006.01)

(52) U.S. Cl.
CPC .. *A01G 2003/005* (2013.01); *A01G 2003/007* (2013.01)

(56) References Cited

U.S. PATENT DOCUMENTS

| | | | |
|---|---|---|---|
| 4,532,757 A * | 8/1985 | Tutle | A01D 46/24 382/110 |
| 4,926,622 A * | 5/1990 | McKee | A01D 43/14 56/16.8 |
| 4,975,016 A | 12/1990 | Pellenc et al. | |
| 5,005,347 A | 4/1991 | Kedem et al. | |
| 6,311,017 B1 * | 10/2001 | Mori | G03B 17/08 348/81 |
| 7,540,137 B2 | 6/2009 | Gray | |
| 7,640,091 B2 * | 12/2009 | Berg | A01D 46/28 56/328.1 |
| 7,765,780 B2 | 8/2010 | Koselka et al. | |
| 9,462,749 B1 * | 10/2016 | Jens | A01D 46/30 |
| 2005/0091957 A1 | 5/2005 | Stanners et al. | |
| 2006/0150602 A1 * | 7/2006 | Stimmann | A01D 46/30 56/10.5 |
| 2006/0213167 A1 | 9/2006 | Koselka et al. | |
| 2011/0047951 A1 | 3/2011 | Moore | |

OTHER PUBLICATIONS

International Search Report and Written Opinion of the International Searching Authority for PCT Application PCT/US2016/052528 dated Jan. 26, 2017.

Australian Examination Report No. 1 for Australian Application No. 2016324492 dated Mar. 31, 2020.

* cited by examiner

SELF-GUIDED BLOSSOM PICKING DEVICE

CROSS-REFERENCE TO RELATED APPLICATIONS

The present application is a 35 U.S.C. 371 US national phase application of PCT international application serial number PCT/US2016/052528, filed Sep. 19, 2016, which claims priority to Provisional Application Ser. No. 62/220,482, filed Sep. 18, 2015, which is incorporated herein by reference.

STATEMENT REGARDING FEDERALLY SPONSORED RESEARCH

Not applicable.

BACKGROUND OF THE INVENTION

The invention relates generally to a device for picking blossoms from a plant. More specifically, the invention relates to a self-guided device, whether pulled or self-propelled, that can identify, locate, and remove a blossom or other undesirable growth from plants growing in a field.

Commercial fruit and vegetable farmers often transplant seedlings grown by a nursery rather than starting a plant from seed. To grow a plant suitable for transplantation by a farm, the nursery encourages root and leaf development over fruit production by removing the flower blossom before the flower is pollinated and matures into a fruit or vegetable. If a fruit is present, it is removed as well. Typically, blossom and fruit removal is a labor intensive process involving workers picking the blossoms by hand. It would therefore be advantageous to develop a device for the removal of blossoms and other undesirable parts from a plant.

BRIEF SUMMARY OF THE INVENTION

According to embodiments of the present disclosure is a device to remove blossoms from plants growing in field. In one embodiment, the device comprises a movable arm, a picker mounted on the end of the movable arm, a cutter disposed on an end of the picker, a vision system that identifies a blossom or fruit, and a controller that directs the picker within cutting range of the blossom or fruit. The movable arm moves the picker in a horizontal plane, whereas the cutter moves in a vertical direction, according to one embodiment. When in position, blades in the cutter are actuated and the blossom or fruit is removed. In field operation, the device is pulled or self-propelled across the field to remove blossoms from a row of plants.

To identify and locate a blossom growing on a plant, a vision system comprising an image capture device and machine vision module detects the presence of the blossom or fruit and provides the information to a controller. In one embodiment, the image capture device is a stereo camera and sends image data of the plant to the machine vision module, which is capable of identifying the blossom or fruit in the image data. The controller processes the information provided by the vision system and causes the location of the picker to be aligned with the blossom. The controller accounts for the difference in the location of the image capture device relative to the plant to ensure proper alignment of the picker. With the picker aligned over the blossom, a cutter is actuated and the blossom or fruit is removed from the plant.

DETAILED DESCRIPTION OF THE INVENTION

Figure 1:
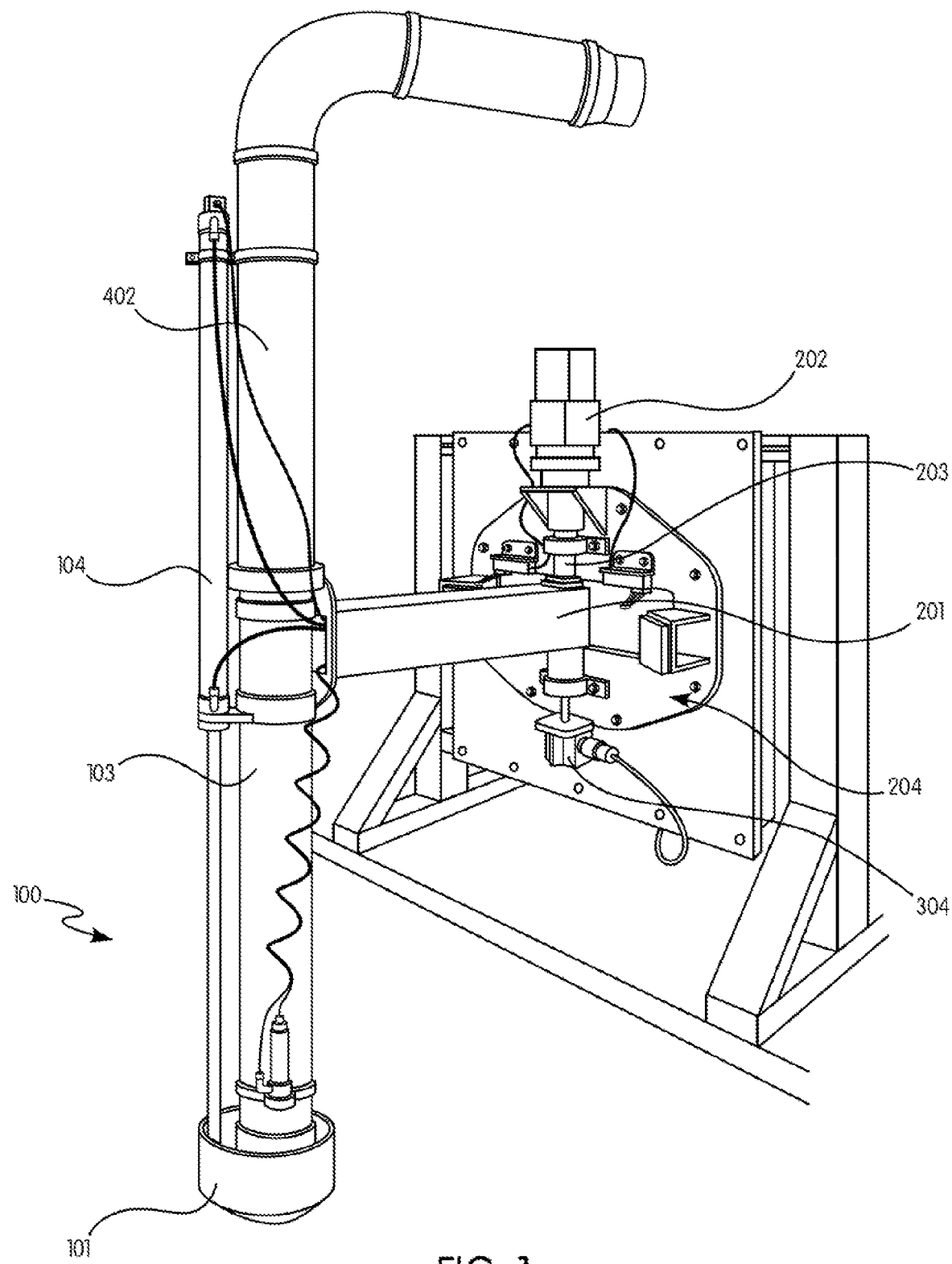
FIG. 1 depicts the device according to one embodiment.

FIG. 1 shows the device according to an example embodiment. In this embodiment, a picker 100 is comprised of a cutter (or cutting head) 101 disposed on the end of an extension 103 and an actuation mechanism 104. As shown in greater detail in FIGS. 7-8, the cutter 101 comprises a set of blades 102 that are connected to an actuation mechanism 105, such as a pneumatic or electric actuator capable of extending and retracting the blades 102, according to one embodiment.

Figure 7:
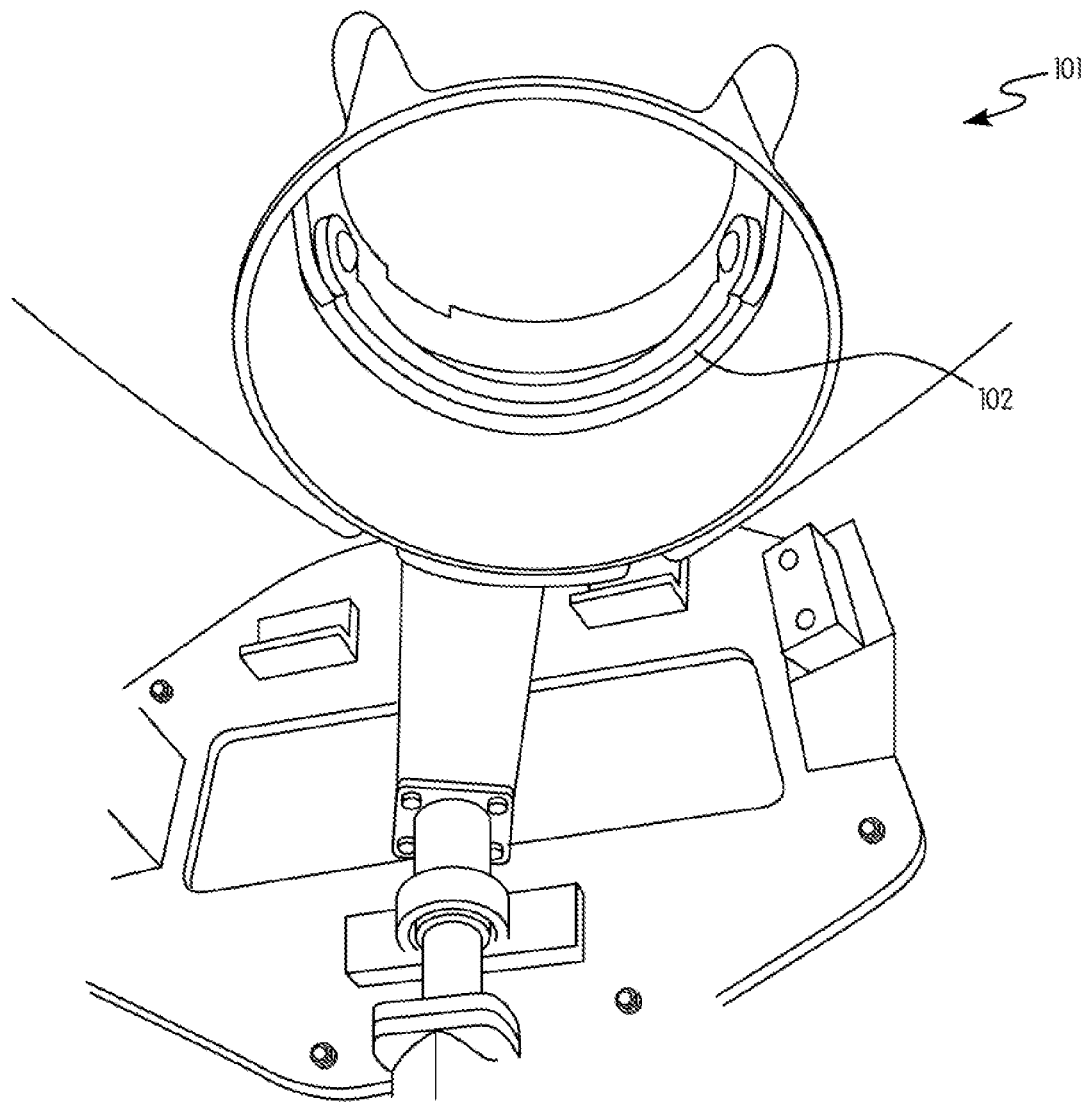
FIG. 7 is an end view of the cutter, with cutting blades visible.
Figure 8:
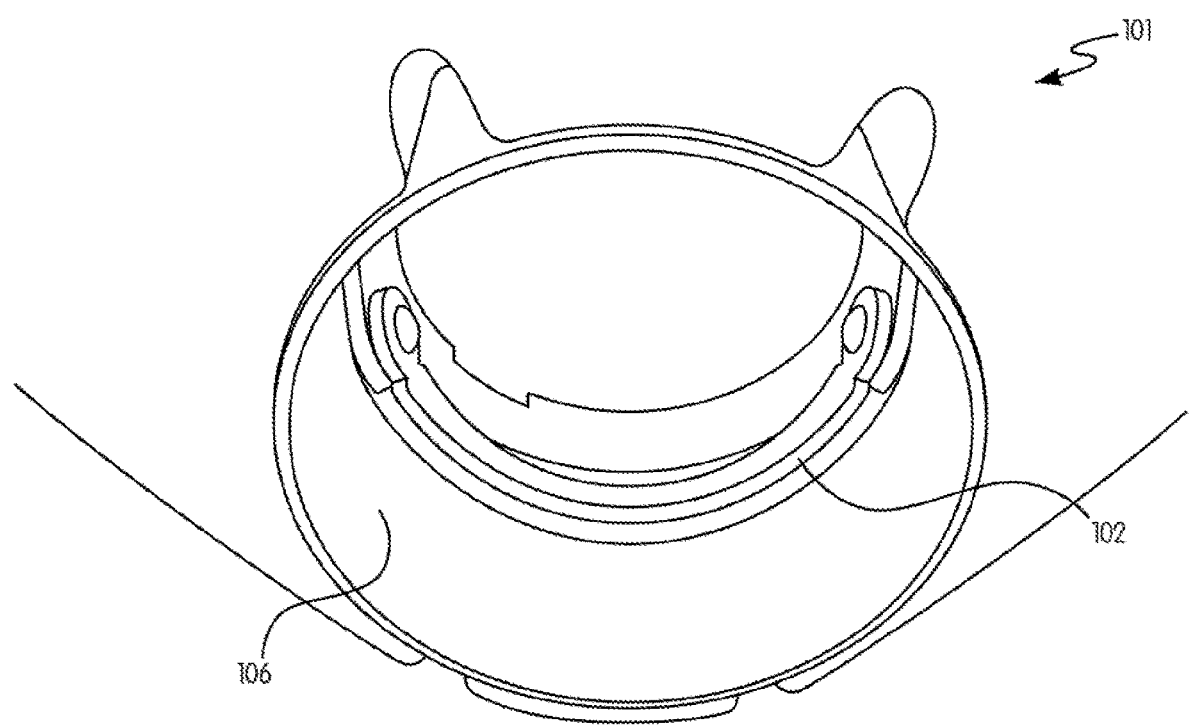
FIG. 8 is an alternate view of the cutter blades.

In the embodiment shown in FIGS. 7-8, the blades 102 are semi-circular bands that are pivotally mounted on each end of the band. As shown in FIG. 8, a first blade 102 of a pair is mounted opposite a second blade 102, with each blade positioned near the perimeter of the cutter 101 opening when in the retracted position. Each blade 102 shares a common rotation axis. When positioned over a blossom, the actuation mechanism 105 causes opposing blades 102 in the cutter 101 to rotate and extend towards the bottom of the cutter 101, with one blade 102 overlapping the other blade 102 in the fully extended position. Like a pair of scissors, any material caught between the advancing blades 102 will be cut.

Figure 17A:
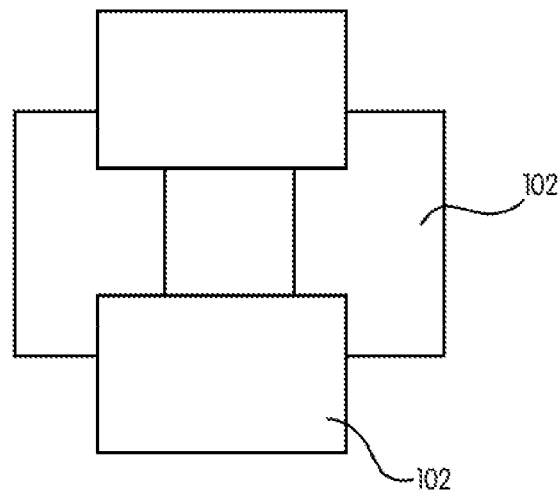
FIGS. 17A-17B show a blade arrangement in the cutter according to one embodiment.
Figure 17B:
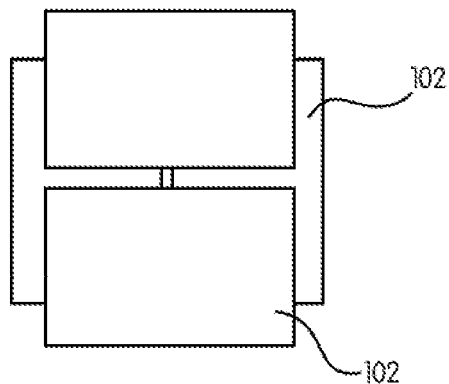

In an alternative embodiment, as shown in FIGS. 17A-17B, flat blades 102 extend and retract on a common plane. In one example of this embodiment shown in FIG. 17A, four blades 102 are arranged to create a square opening between the blades 102, where the opening is defined by one edge of each of the four blades 102. As shown in FIG. 17B, the opening progressively decreases in area until the blades intersect in a cutting motion as each blade 102 moves toward the center. The blades can move linearly or in a sweeping action. Further, the blades 102 in either of these example embodiments can have a straight, serrated, or other edge profile.

In the planar blade embodiment, the location of the cut can be altered slightly, whereas curved blades always cut at the apex of the curved blades 102. For example, in a four blade 102 arrangement, a first blade 102 could remain stationary while the blade 102 on the opposite side advances, shifting the opening from the center of the cutter 101 to the side with the stationary blade 102. The remaining two blades 102 can advance in unison or be varied as well. Stated differently, the location of the square opening can be adjusted in any direction from the center depending on how the blades 102 are actuated. While the cutter 101 has been described in example embodiments as various orientations of blades 102 and an actuation mechanism 105, various other removal mechanisms, such as a wire cutter or string cutter for example, can be utilized in the cutter 101.

In yet another alternative embodiment, the cutter 101 further comprises a spray nozzle 106 that can spray an herbicide, fungicide, or other liquid on the blades 102 or cutter 101. If the blades 102 or cutter 101 come into contact with a diseased plant, the disease can be spread to each subsequent plant contacted by the device. As such, spraying the blades 102 or cutter 101 with a fungicide from the spray nozzle 106 can prevent the disease from spreading. FIG. 8 shows the spray nozzle 106, which is capably of spraying a mist or stream of liquid on blades 102 and cutter 101. The spray nozzle 106 can be connected to an external tank and pumping system.

The spray nozzle 106 can also be used to lubricate the blades 102. Some plants, such as strawberry plants, produce a sticky substance when cut. This substance can foul the blades 102, leading to missed cuts or quickly dulled blades 102. To prevent problems associated with these types of plants, a lubricant (alone or in combination with a fungicide or herbicide) is directed onto the blades 102 from the spray nozzle 106 after each cut or several cuts. Depending on the amount of blade fouling, the blades 102 may need lubricated only intermittently. Alternatively, if lubrication is not necessary, the spray nozzle 106 can be a component of the device separate from the cutter 101.

Figure 2:
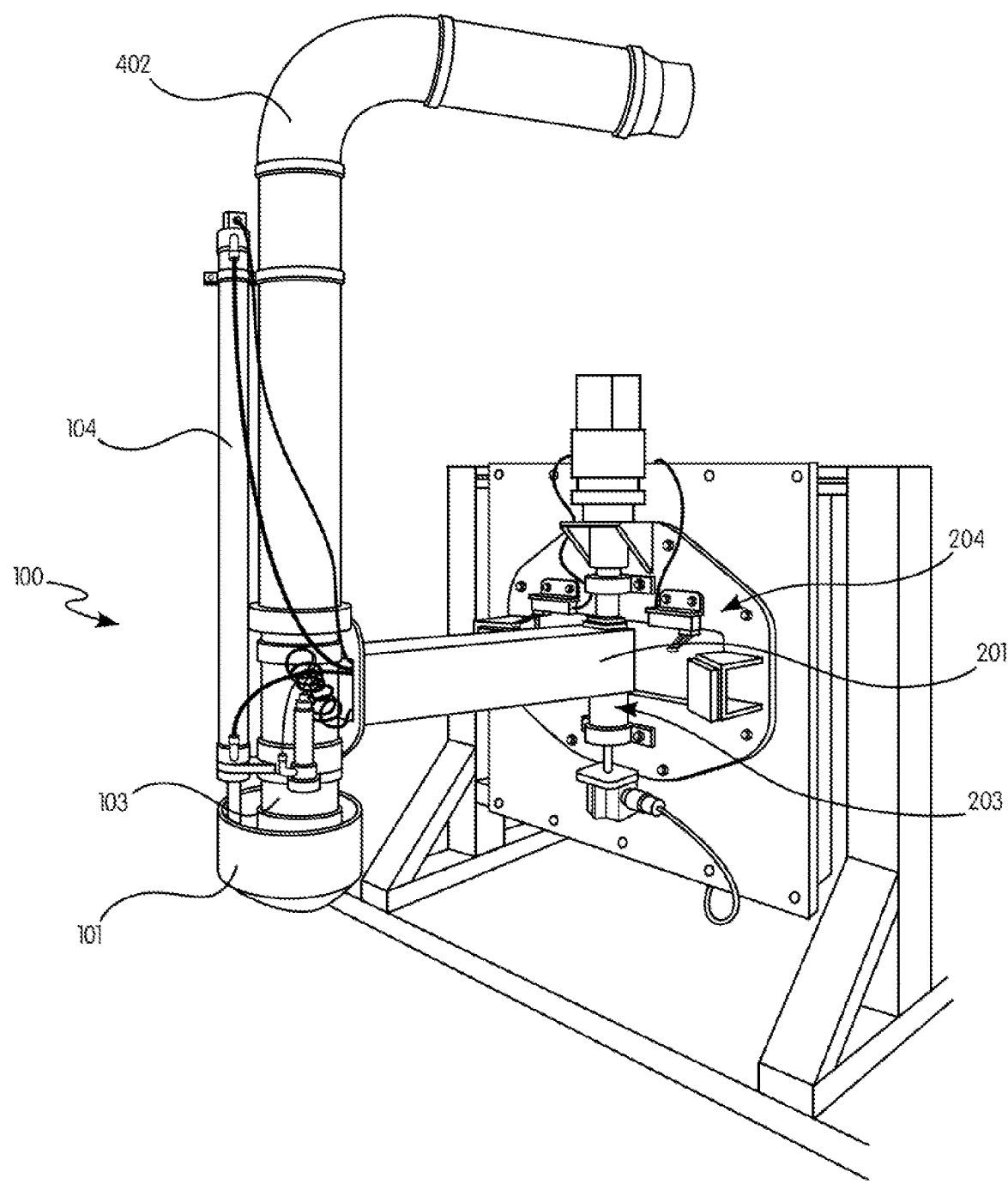
FIG. 2 is an alternate view showing the picker in a raised position.

Referring again to FIG. 1, in one embodiment, the cutter 101 is mounted on the end of extension 103, which can be tubular in shape. However, other shapes with an interior passage can be used. Actuator 104 enables extension 103 to move vertically in a telescoping manner, the allowing the depth of the cutter 101 relative to the plant to be adjusted. FIG. 1 shows the extension 103 and actuator 104 in the extended position. In contrast, FIG. 2 shows the extension 103 in the retracted position, with the extension 103 contained within the end of a vacuum conduit 402. More specifically, the extension 103 connects to a vacuum conduit 402 at an end of the extension 103 opposite the end where the cutter 101 is mounted. In one embodiment, the extension 103 and end of the vacuum conduit 402 are coaxial, with the extension 103 having a slightly smaller diameter to allow telescoping movement between the two.

Figure 3:
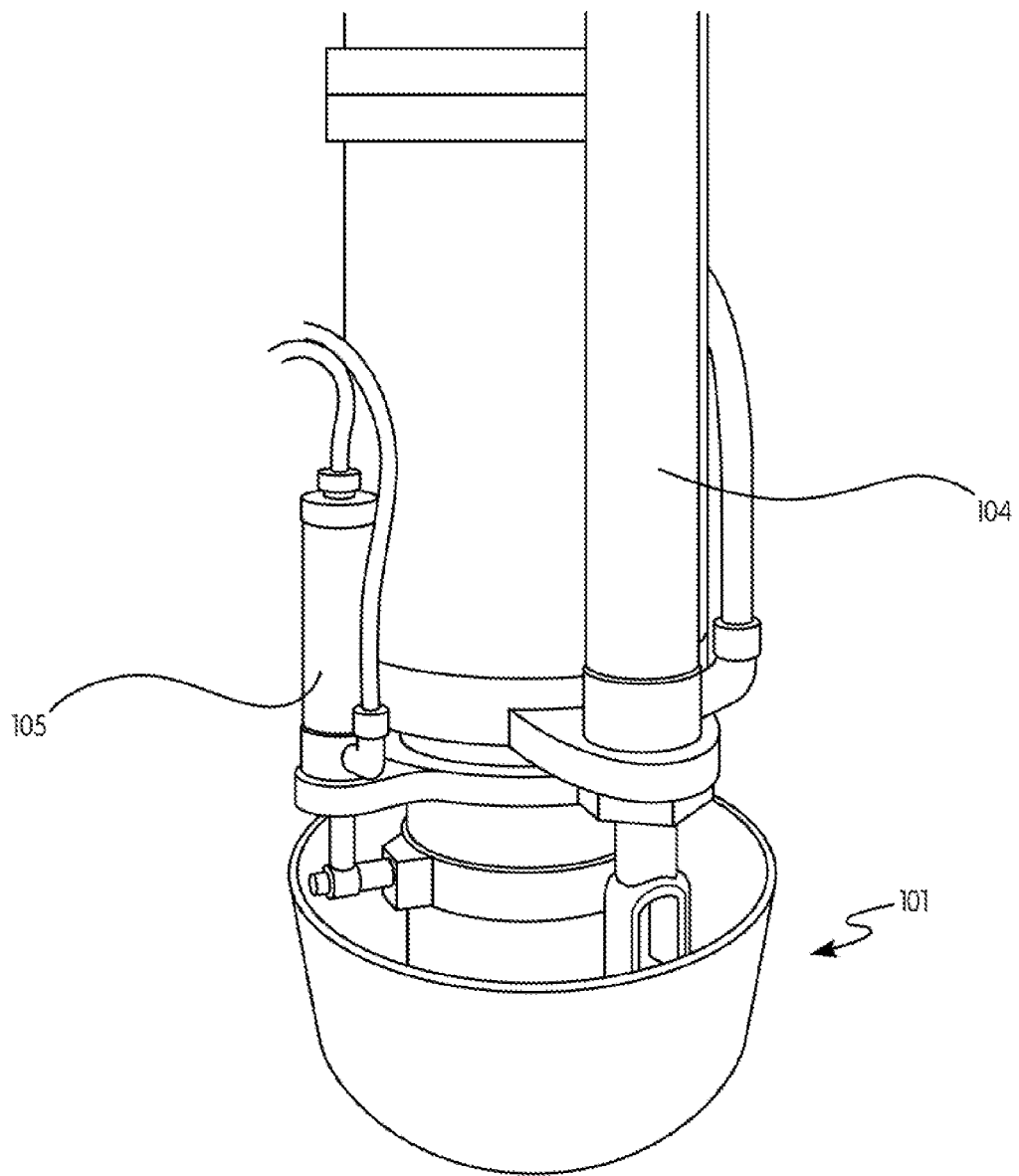
FIG. 3 shows the end of the cutter.

An embedded controller 300 controls the positioning of the extension 103 based on the depth of a blossom, as recognized by the vision system 301. While the controller 300 provides control signals for movement of the extension 103, the extension 103 is physically controlled by an actuator 104. In one example embodiment, the actuator 104 is a pneumatic device with a position sensor, as shown in greater detail in FIG. 3. If a position sensor is used, the depth position of the extension 103 is sent to the embedded controller 300 to be used with other data collected by the controller 300. In one embodiment, the controller 300 positions the cutter 101 slightly below the top of the blossom to ensure it is entirely surrounded by the cutter 101.

As previously discussed, the picker 100 is connected to a vacuum conduit 402. In one embodiment, a vacuum source 401 connects to the picker 100 through vacuum conduit 402 and provides a vacuum pressure within the extension 103. Providing vacuum pressure within the picker 100 serves two primary purposes. First, the vacuum draws the blossom or inflorescence into the end of the cutter 101. In field conditions, some blossoms may lay flat and the vacuum aids in the cutting process by drawing the blossom into an upright position within the cutter 101. In this embodiment, vacuuming and cutting occur as simultaneously. Another purpose of the vacuum is to collect blossoms that have been severed from the plant. The picked blossoms can be stored and later disposed, or they can be mulched and disposed back onto the field. In some situations, it can be useful to collect severed blossoms to prevent the spread of disease in the field.

Referring again to FIGS. 1-2, the picker 100 is mounted to an arm 201. In one embodiment, the arm 201 is a SCARA, or Selective Compliance Articulated Robot Arm. When used in the device of the present invention, a SCARA configuration allows movement in a horizontal plane (i.e. parallel to the ground), but is rigid in the vertical direction. A person having skill in the art will appreciate that a SCARA configuration allows multiple joints along the arm 201, providing a more complex movement of the cutter 101 attached to the end of the arm 201. As discussed above, the extension 103 and actuator 104 attached to the cutter 101 provides vertical movement, giving the cutter 101 a full range of motion in three directions when combined with the arm 201.

As shown in the embodiment depicted in FIG. 1, the arm 201 is pivotally secured at a joint 203 to a base 204, with the length of the arm 201 substantially parallel to the ground. The base 204 provides a mounting point for the arm 201 and comprises a portion of the tractor, cart, tow vehicle, or mobile platform in alternate embodiments. For example, in one embodiment, the device is a self-contained unit, so the base 204 would be a stand-alone component of the device. By using an articulated arm 201, the device covers a greater width than if the picker 100 were fixedly attached to the base 204. For example, for a cutter 101 having a width of 10 cm, a fixed-arm device would cover a path only 10 cm wide as it travels over the field. On the other hand, if the arm 201 is 1 m long, the same 10 cm wide cutter 101 can effectively cover a width of 2 m as it swings from side to side.

Figure 4:
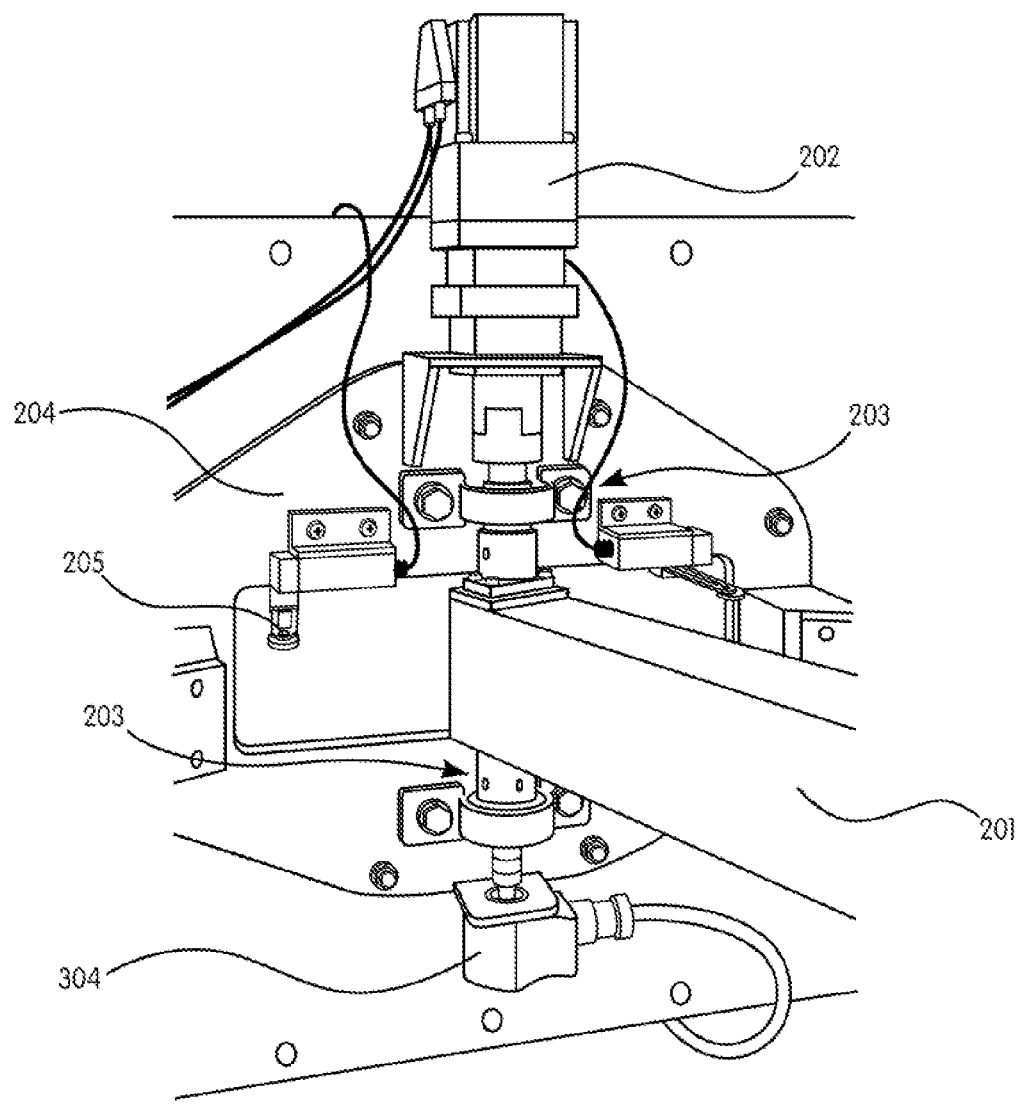
FIG. 4 is a detailed view of an arm and motor that controls the movement of the picker.
Figure 5:
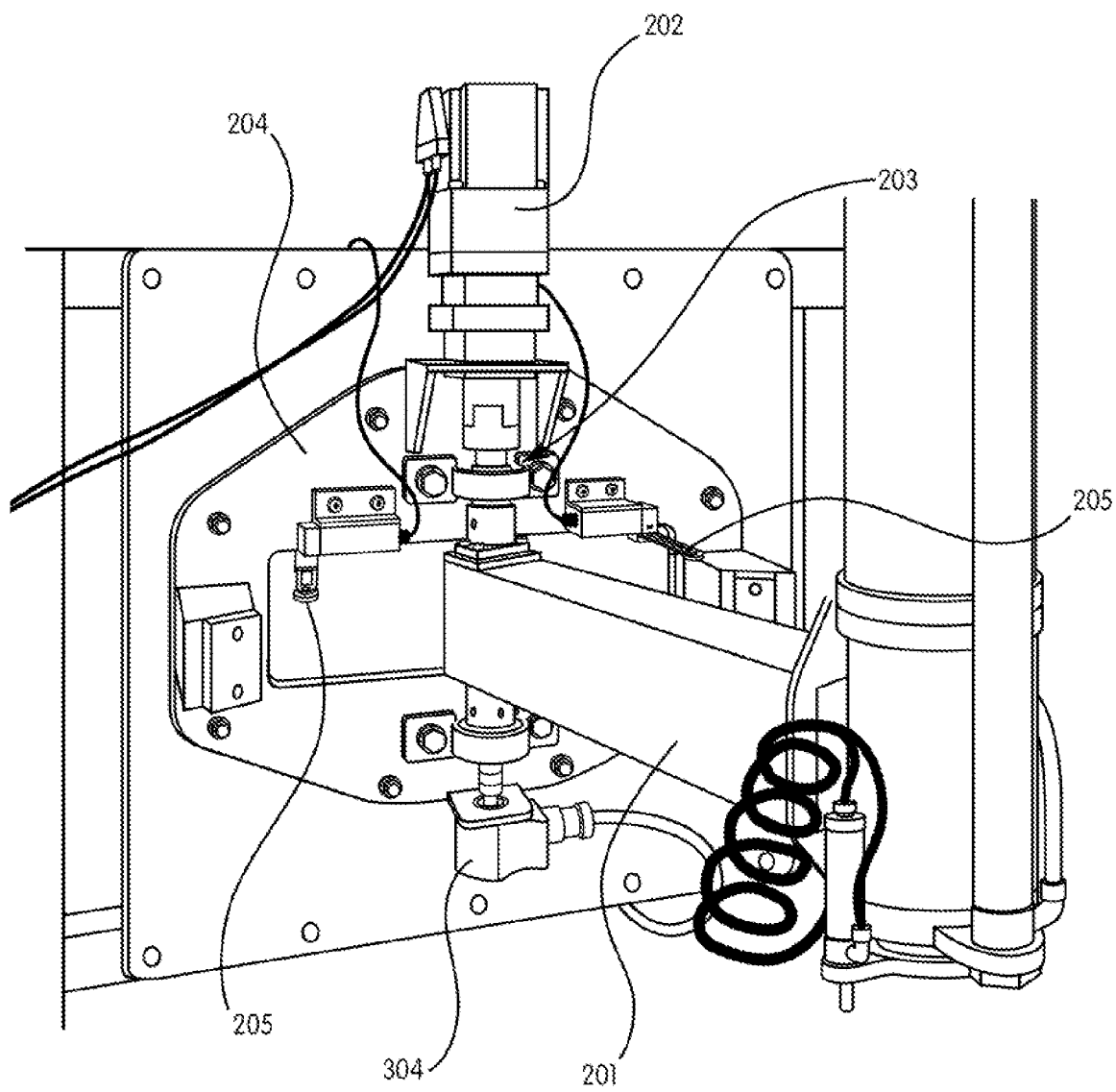
FIG. 5 is an alternate view showing the picker mounted to and end of the arm.

In one embodiment, the joint 203 comprises a shaft and bearings, as shown in FIGS. 4-5, or it can be any other mechanical coupling, such as a bushing, known in the art that allows pivoting of the arm 201 relative to the base 204. In one embodiment, shown in FIGS. 4-5, limit switches 205 are provided to prevent over-rotation of the arm 201. In alternative embodiments, the arm 201 is free to rotate a full 360 degrees.

A motor 202 is connected, directly or indirectly, to arm 201 to provide the rotational/horizontal movement of the arm 201. In the embodiment shown in FIGS. 4-5, an output shaft of the motor 202 is connected directly to the shaft of joint 203 in a coaxial configuration. In alternative embodiments, the motor 202 connects to the arm 201 through gearing or other mechanical linkages. For example, the motor 202 can be connected through a gear box to adjust the torque output of the motor 202. The torque of the motor 202 partly determines the rotational acceleration of arm 201, and can vary depending on the intended application and the weight of the arm 201 and picker 100. With greater acceleration, the arm 201 is able to move through its range of motion quicker, possibly allowing for a greater forward velocity of the device across the field. Like actuator 104, the motor 202 receives an input signal from controller 300, based in part on the location of a blossom and the current location of the picker 100.

Figure 18A:
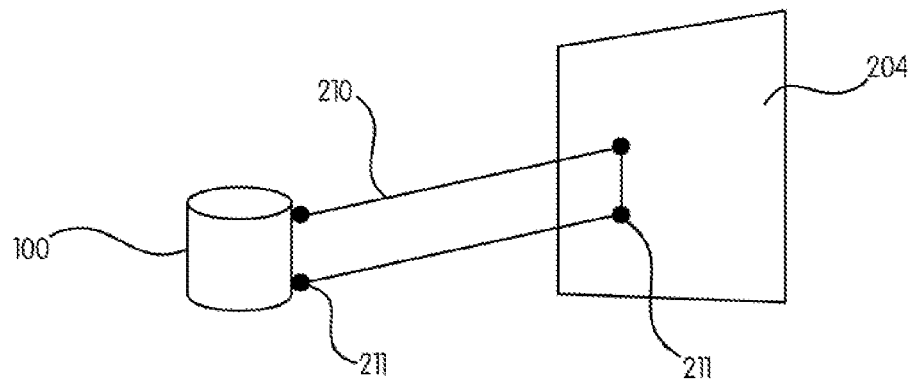
FIGS. 18A-18B illustrate the movement of a linkage assembly, according to one embodiment.
Figure 18B:
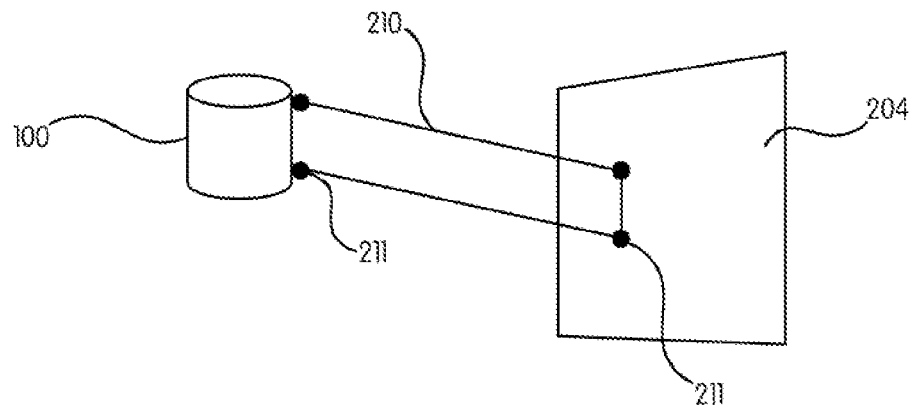

In an alternative embodiment, the picker 100 is mounted at the end of a linkage assembly 210. As shown in FIGS. 18A-18B, the linkage assembly 210 comprises a bar linkage, where a series of pivots 211 allow the picker 100 to move in a vertical direction. FIG. 18A shows the picker 100 in a lowered position, whereas FIG. 18B shows the picker 100 in a raised position. In this embodiment, one end of the linkage assembly 210 is attached to the picker 100 and a second end is connected to base 204 through pivoting joint 203. In the example shown in FIGS. 18A-18B, an axis of the picker 100 remains nearly vertical through its range of motion through the use of pivots 211. By connecting linkage assembly to joint 203, the picker 100 is still able to move in a horizontal direction. While the picker 100 has been disclosed as being connected to an arm 201 or linkage assembly 210 in example embodiments, any alternative arrangement that allows the picker 100 to be positioned accurately in both the horizontal and vertical direction can be used.

Also shown in FIGS. 4-5 is a position encoder 304 that is connected to the arm 201. The position encoder 304 determines the absolute position of the arm 201 and provides this output data to the controller 300. The output of the position encoder 304 can be used to determine how far and what direction the picker 100 has to move to be positioned over a blossom. While the encoder 304 is shown as a separate component in FIGS. 4-5, the encoder 304 is a built-in component of the motor 202 in an alternative embodiment. When a built-in position sensor is used, the encoder 304 does not have to be used or can be used as a redundant source of position information.

Figure 6:
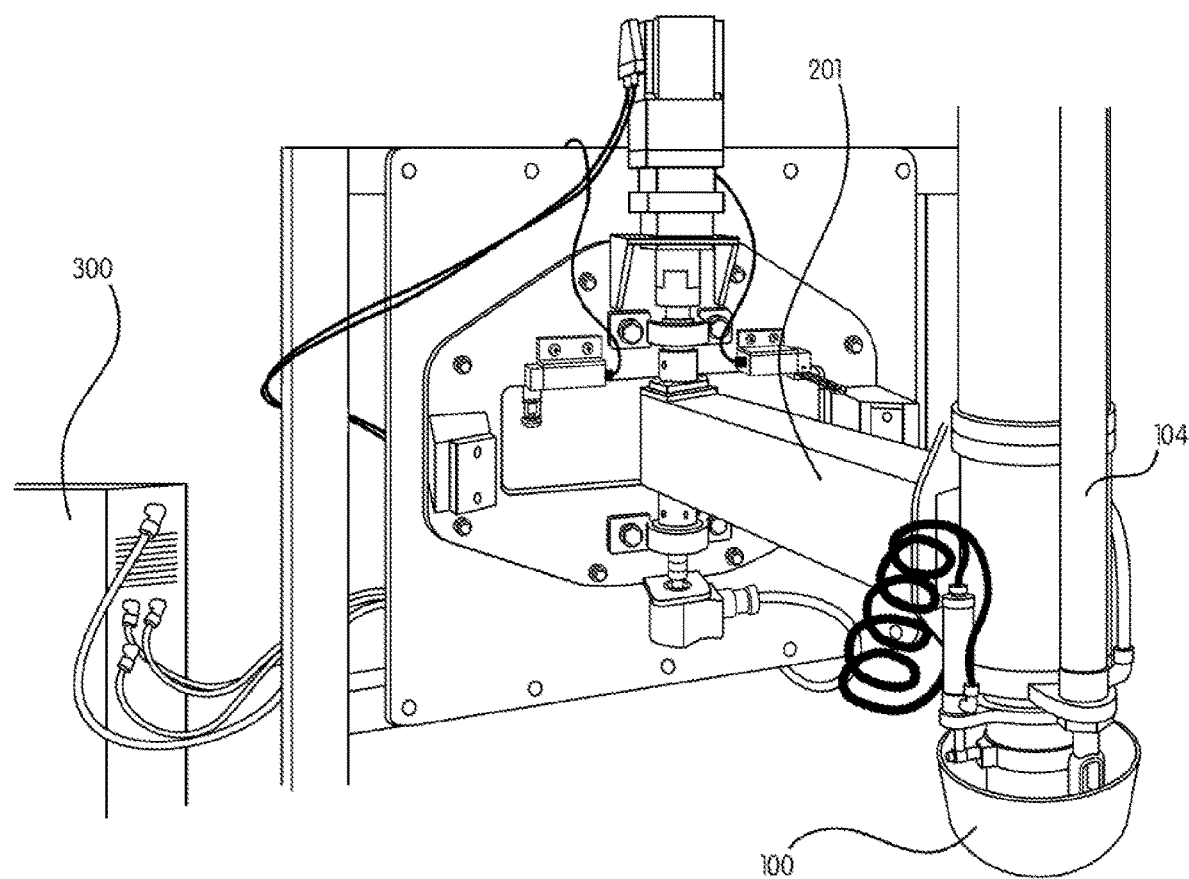
FIG. 6 is a view showing the embedded controller.
Figure 9:
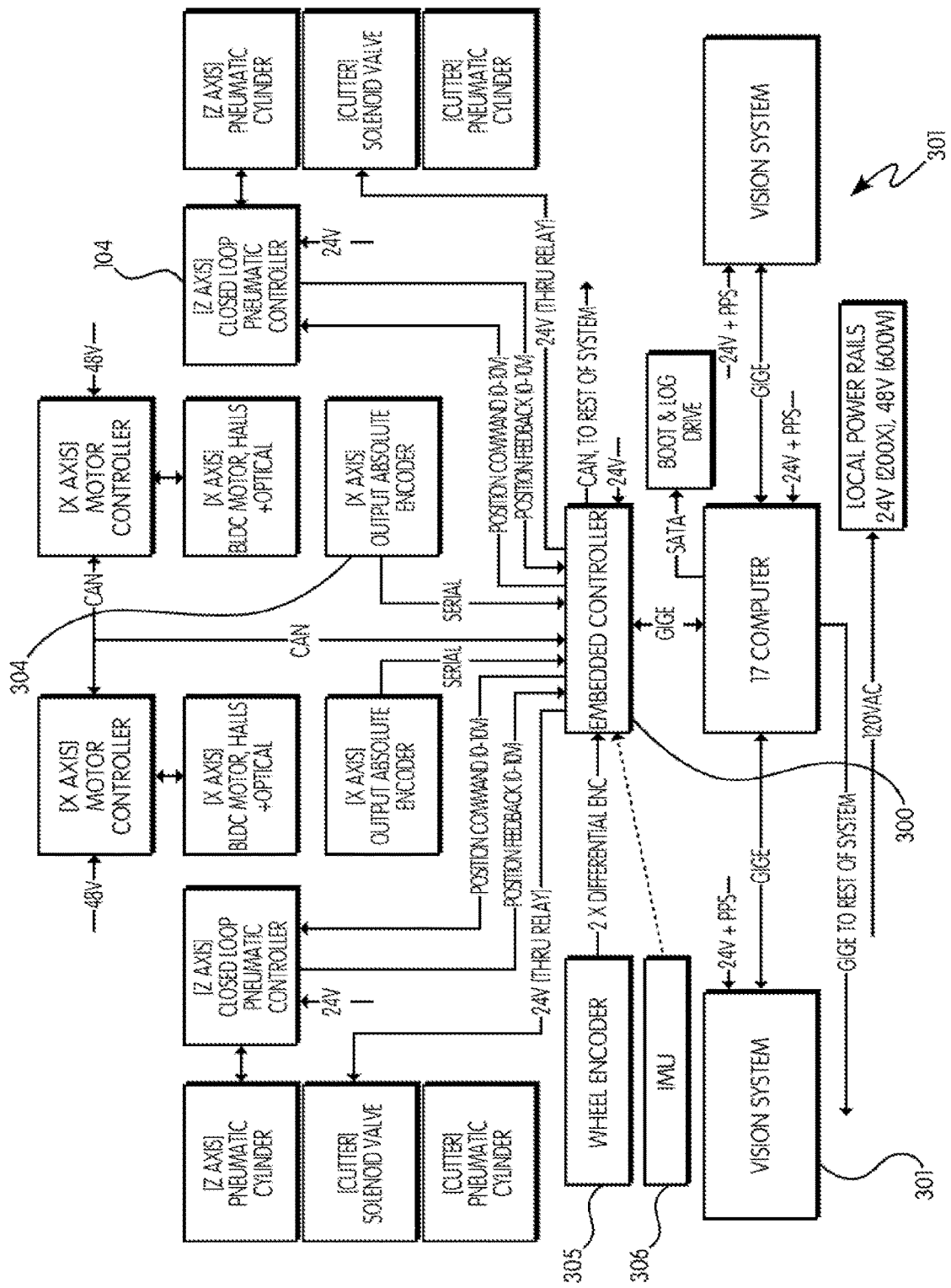
FIG. 9 is a system diagram according to one embodiment.
Figure 10:
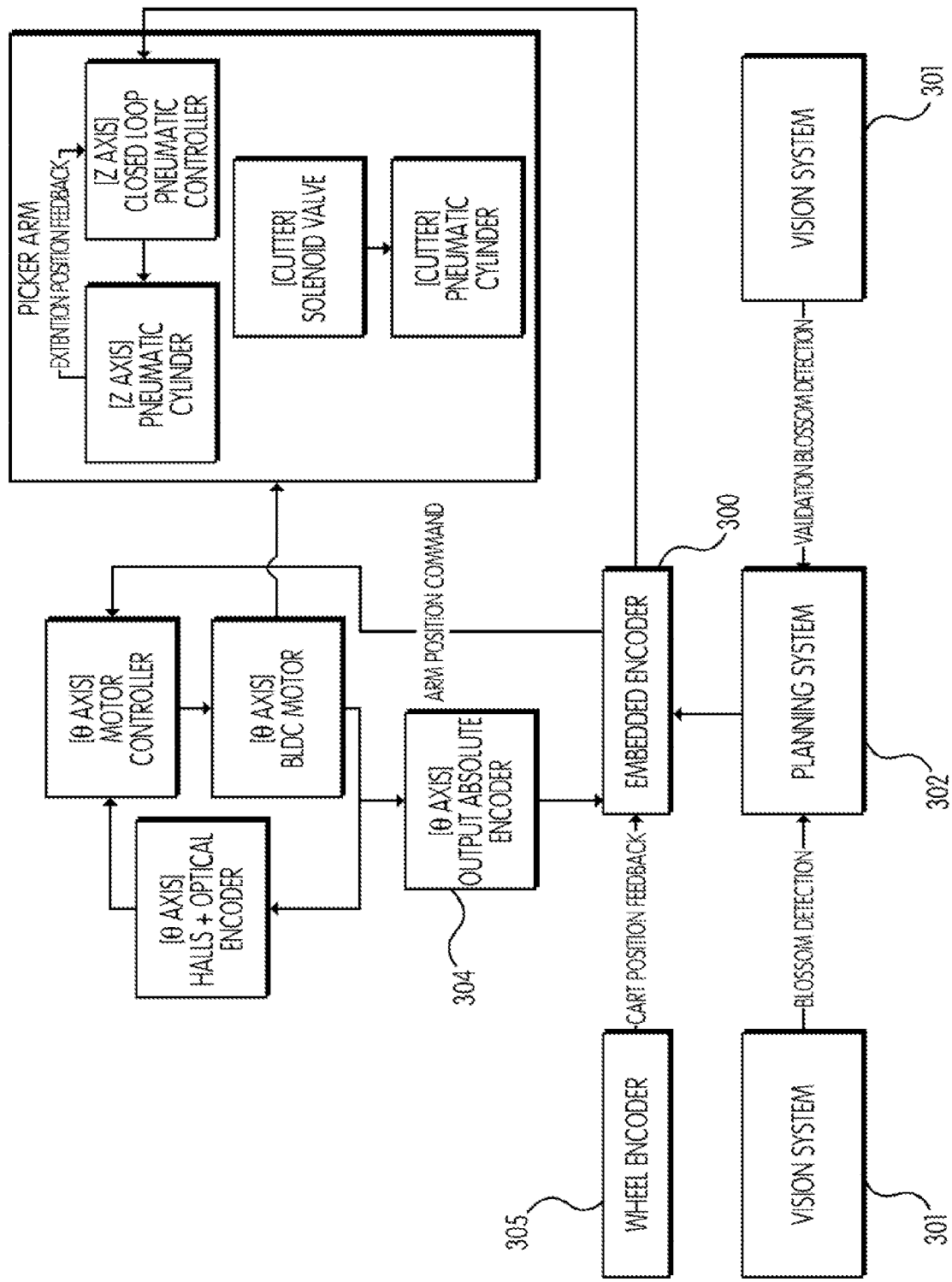
FIG. 10 is a system diagram according to an alternative embodiment.
Figure 11:
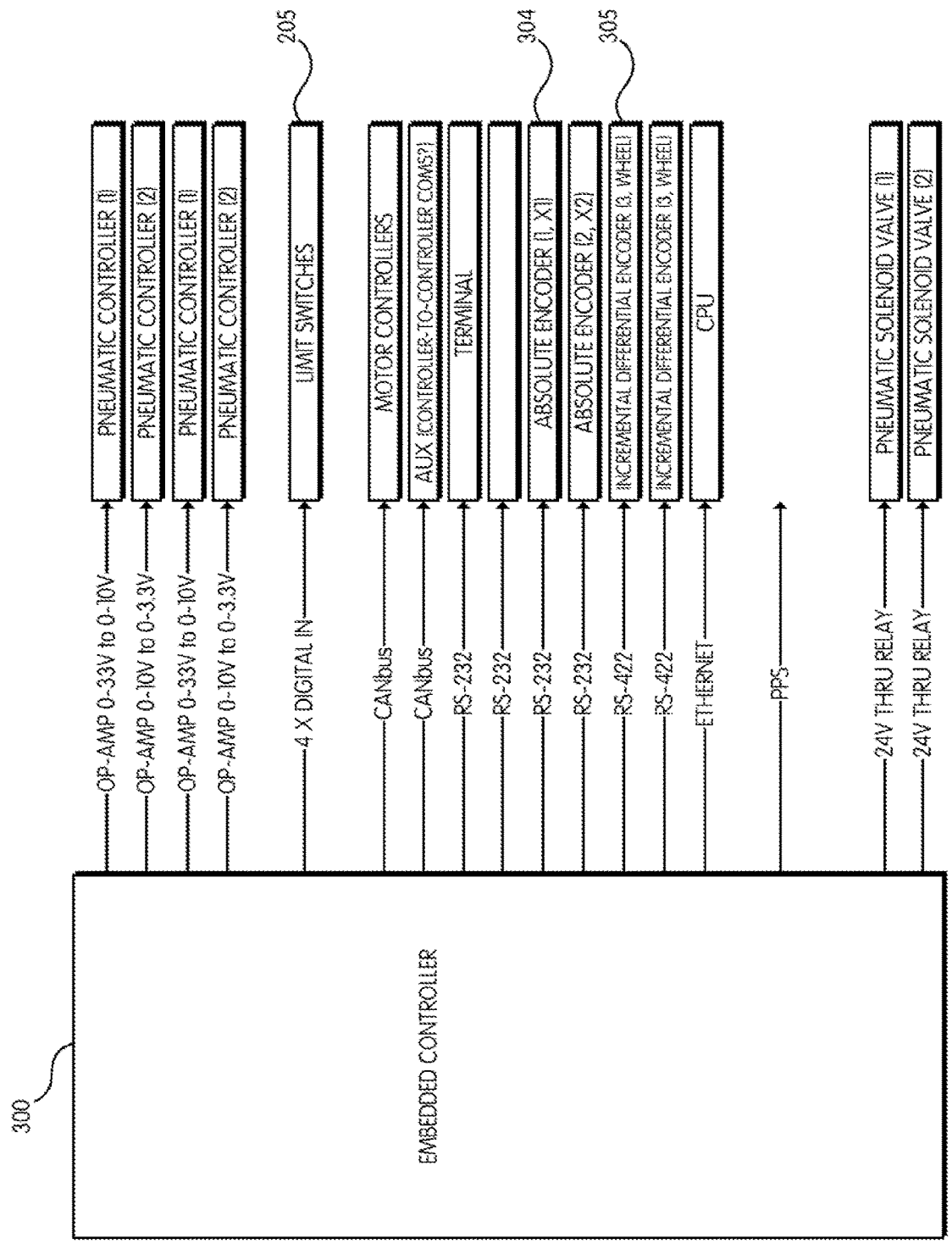
FIG. 11 shows the electrical connection of various components to the embedded controller.

As shown in the embodiment depicted in FIG. 6, the controller 300 is a computer that receives input from the actuator 104, position encoder 304, the vision system 301, and other connected components. However, the controller 300 or any other module may comprise a microcomputer, a microprocessor, a microcontroller, an application specific integrated circuit, a programmable logic array, a logic device, an arithmetic logic unit, a digital signal processor, or another data processor and supporting electronic hardware and software. FIG. 9 shows the various devices that provide data to the embedded controller 300. After receiving and processing the data, the embedded controller 300 sends position commands to the actuator 104, blade actuation mechanism 105, and motor 202. FIG. 10 is a depiction of an alternate embodiment of the device of the present invention which includes a planning module 302 used for coordinating the movement of picker 100 when multiple blossoms are detected in proximity to each other. In some situations, the planning module 302 may direct the device to ignore a blossom on the right side of the row if cutting that blossom would cause the device to subsequently miss several blossoms on the left side of the row, for example. In one embodiment, the planning module 302 determines a path for the cutter 101 based in part on the identification of blossoms, the speed of the device, and the maximum acceleration of the arm 201. The planning system 302 can be a standalone module or a software component incorporated into the controller 300. FIG. 11 shows the input/output data streams to embedded controller 300 according to one example embodiment.

As shown in the systems of FIGS. 9-10, a wheel encoder 305 is further connected to the embedded controller 300. The wheel encoder 305 provides information about how far the device has travelled across the field, whether self-powered or drawn by a vehicle 602, such as a tractor. The information is critical in coordinating the movement of the picker 100. For example, if the vision system 301 is detecting plants 1 meter ahead of the picker 100 and the device is travelling at 5 m/s, then the picker 100 will be above the plant imaged by the vision system 301 in about 0.2 seconds after the vision system 301 passes over the plant. In an alternative embodiment, an inertial measurement unit (IMU) 306 is used to augment the data provided by the wheel encoders 305. Without accurate data about how far the device has traveled in a given time period, this coordination would be imprecise. For the embodiment shown in FIG. 1, the controller 300 would also have to re-calculate the distance of the picker 100 given its current angular position, since the picker 100 is moving in an arc rather than a straight line from one side to the other.

Figure 20:
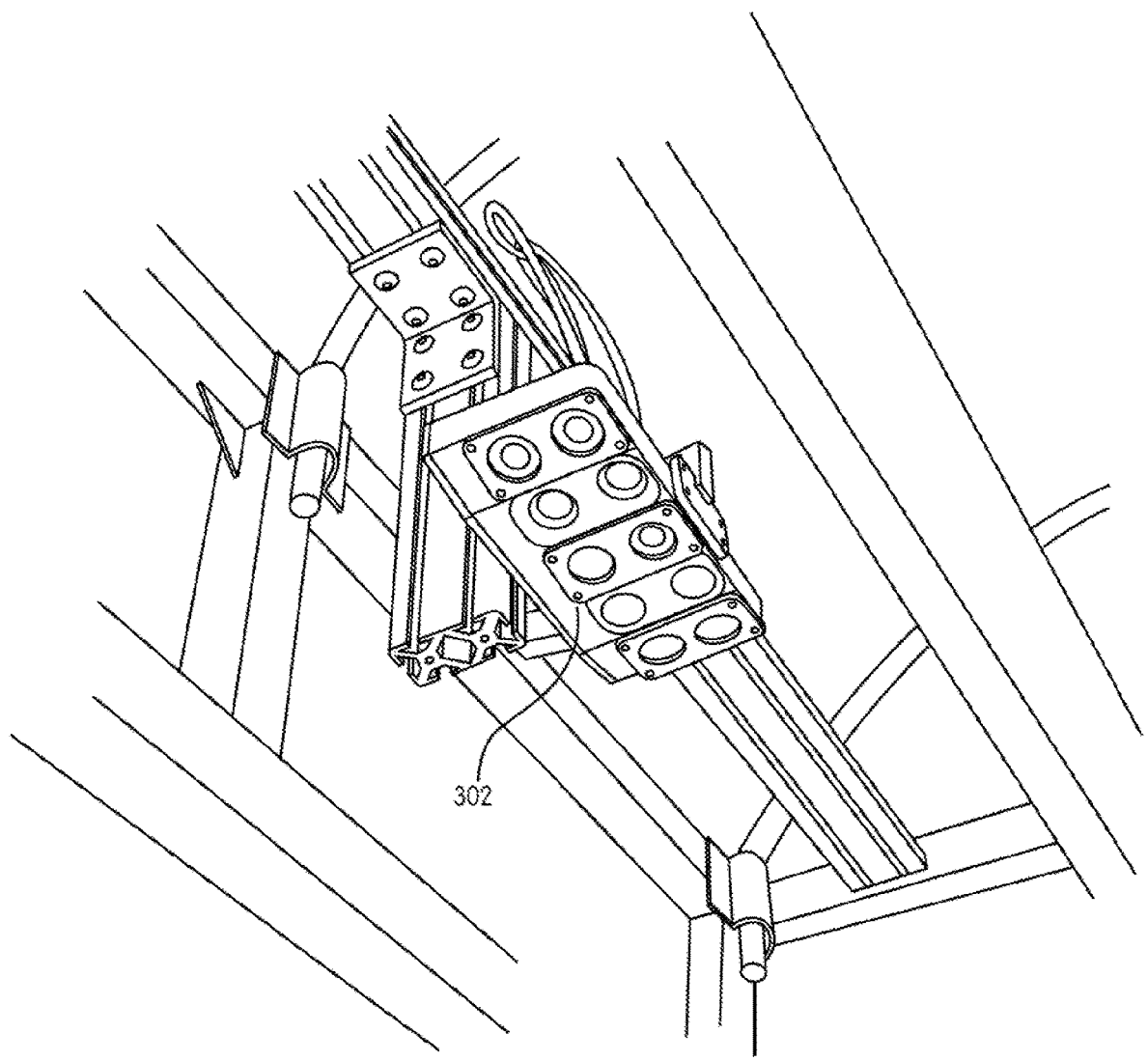
FIG. 20 depicts the image capture device according to one embodiment.

As briefly discussed, the vision system 301 comprises an image capture device 308 and a machine vision module 303. In one embodiment, as shown in FIG. 20, the image capture device 308 is a stereo camera capable of providing a three-dimensional view of the imaged plant, which provides both appearance and depth information. The image capture device 308 can provide image data in the form of video or as a series of still images. Alternatively, the image capture device 308 can comprise a plurality of cameras, with the image data combined to provide stereo image data. Stereo or 3D imaging is necessary to provide depth the information used to control the extension 103 of picker 100. In an alternative embodiment, a two-dimensional camera can be used if the height of the plant is estimated. After gathering the image data, a machine vision module 303 processes the data to locate a blossom within the image.

Often, the inflorescence or blossoms are a different color than the plant and the machine vision module 303 can easily identify the blossom using color filtering techniques. However, the machine vision module 303 may use color discrimination, intensity discrimination, shape discrimination, or texture discrimination to identify background pixels from pixels associated with a portion of the plant to be removed. For example, the machine vision module 303 can identify berries that have matured from the flower stage. Immature berries are often the same color as the leaves, so the machine vision module 303 uses a technique other than color discrimination to locate the berry. In one embodiment, the device removes the entire inflorescence, including berries associated with that inflorescence, or in some situation, it removes isolated berries or other fruit. Pixel patterns or attributes, such as color patterns, pixel intensity patterns, luminosity, brightness, hue, or reflectivity can also be used for identification purposes. In addition, image capture devices 308 providing color information outside of the visible spectrum could be used. For example, infrared cameras are useful when detecting the blossoms of a strawberry plant.

Training of the machine vision module 303 with samples of a particular plant can improve accuracy. In one embodiment, the machine vision module 303 uses an algorithm such as a convolutional neural network to learn what portions of an image are associated with a blossom, fruit, inflorescence, or other undesirable component of the plant. Likewise, the machine vision module 303 can be trained to identify plant runners. In an embodiment where the machine vision module 303 is trained, sample images can be manually labeled to provide examples as a training set for the module 303. However, a person having skill in the art will appreciate that numerous machine vision techniques can be used.

Figure 19:
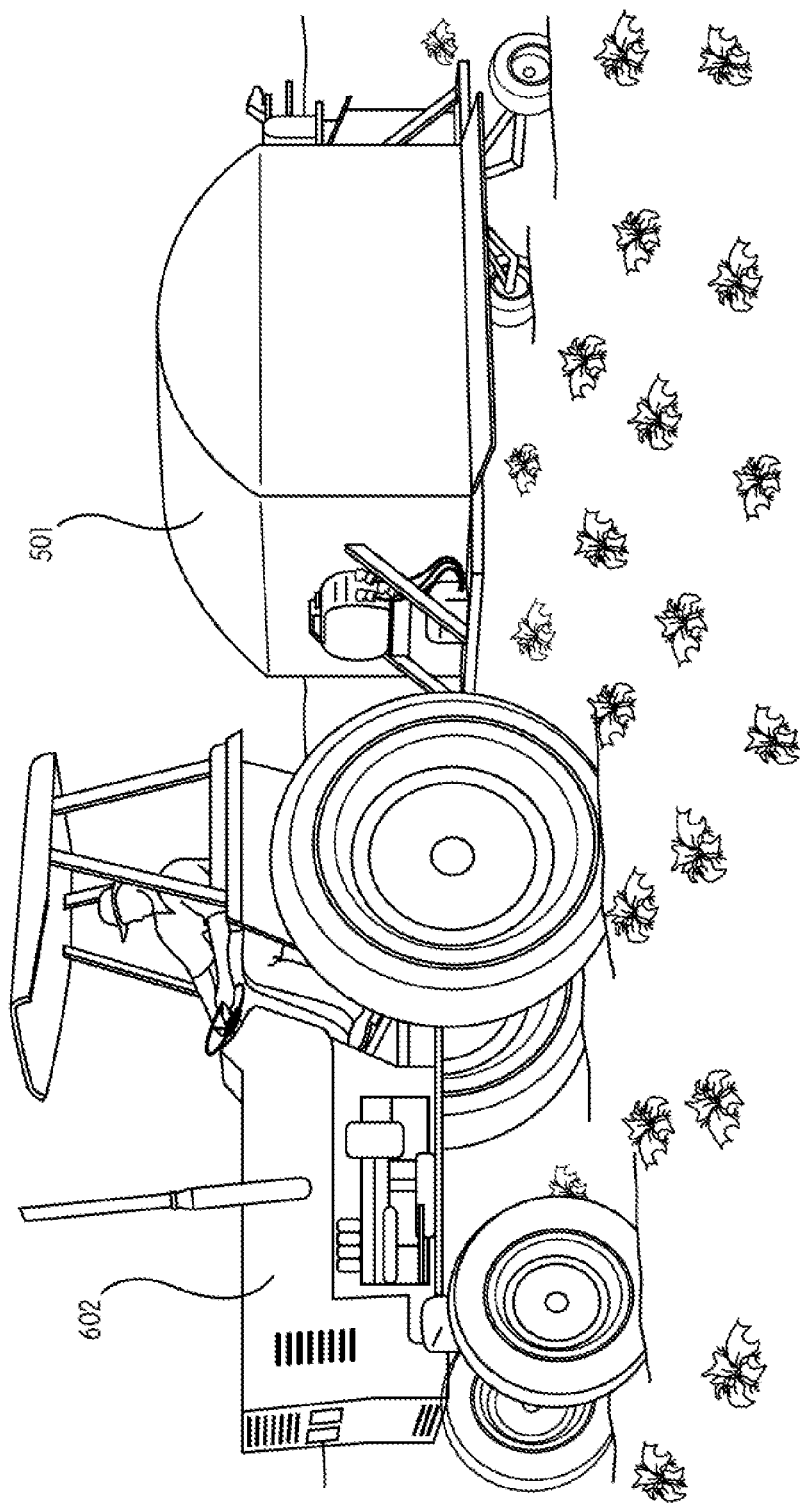
FIG. 19 shows the modular device being towed by a vehicle.

In one embodiment, a translucent shroud 501 (as shown in FIG. 19) is used to provide consistent, diffuse light for the vision system 301. In an alternative embodiment, a lighting system 502 is used to augment the natural light, whether a shroud 501 is used or not. In operation in the field, using natural lighting could inhibit the accuracy of blossom detection since one side of the row of plants could be brightly lit by the sun, whereas the opposite side of the row would be cast in a shadow. As such, a lighting system 502 can be beneficial to reduce shadows and provide improved contrast for the vision system 301.

Figure 12:
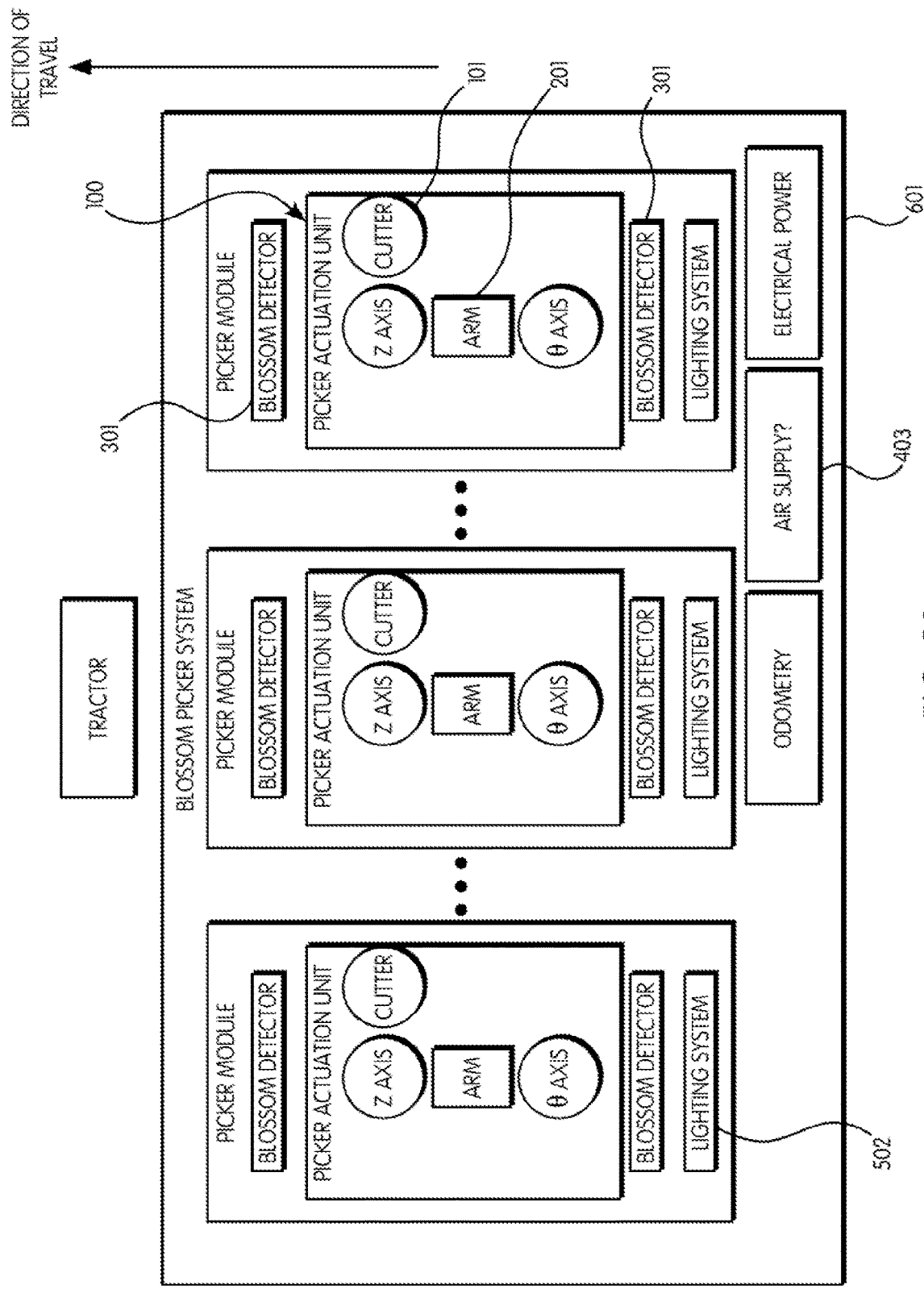
FIG. 12 shows a device with multiple modular units on a carrier, according to one embodiment.

Referring again to the figures, the embodiment shown in FIG. 12 depicts multiple vision systems 301 used for each picker 100. Specifically, a first vision system 301 is placed in front (relative to the direction of travel) of the picker 100 and a second vision system 301 is placed behind the picker 100. Using multiple vision systems 301 improves accuracy as a blossom may be occluded by leaves, stems, or other plant material from the vantage point of any single vision system 301. When two vision systems 301 are used, the data from both vision systems are sent to the embedded controller 300, which reconciles the data. Additionally, the cutter 101 itself may have a vision system 301 or image capture device 308 to allow for last minute corrections to the position of the cutter 100 as it engages the blossom. A vision system 301 associated with the cutter 101 or picker 100 could increase accuracy in situations where wind, for example, moves the blossom after initial detection by the primary vision system 301 at the front of the device. In this example embodiment, the vision system 301 associated with the cutter could use data from the first vision system 301 to obtain the general location of the blossom, making it easier to find the blossom in the image data. Further, a secondary vision system 301 can be used for quality control, detecting when blossoms engaged by the cutter 101 remain on the plant. As an example, missed blossoms could be the result of jammed or dull blades 202. In this situation, the controller 300 could provide an alert or stop the device until the problem is rectified. The number of vision systems 301 is not limited to one or two, and the total number can vary depending on the desired accuracy and costs. More cameras provide greater accuracy, but increase costs and required computing power.

Figure 21:
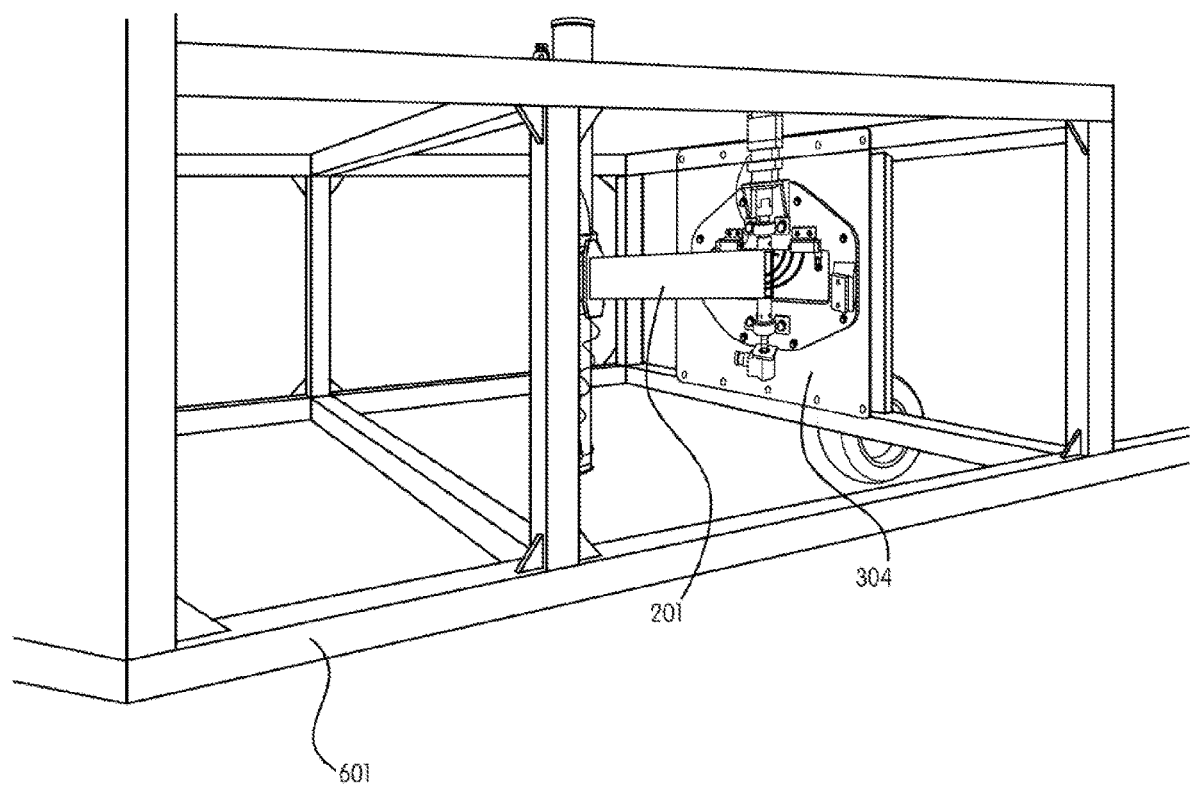
FIG. 21 shows the device mounted in a carrier according to an alternative embodiment.
Figure 22:
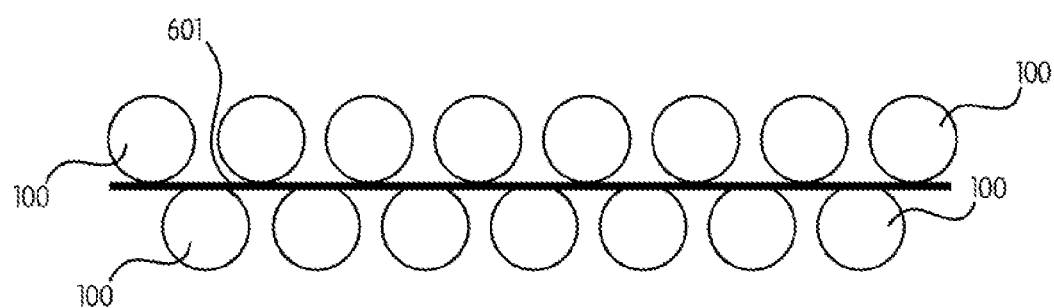
FIG. 22 illustrates multiple modular units mounted in a carrier.

FIG. 12 shows one embodiment where multiple devices 100 are positioned on a carrier 601 pulled by a vehicle 602, such as a tractor or other equipment. The modular units are mounted with a spacing that matches the spacing of the rows of plants. A modular unit can also be mounted on a carrier 601, as shown in FIG. 21. Alternatively, multiple units can be mounted on a single carrier 601 by using cantilevered arms (or wings) extending from the carrier 601. In this manner, only a single set of wheels is necessary. Often, rows of plants are spaced closely together without room for a vehicle. Rather, an access row is interposed between several rows of plants. For example, 15 rows of plants might be separated by a single access row wide enough for a tractor or other vehicle 602 to pass. Using a carrier 601, a greater number of units can be covered. FIG. 22 shows one example embodiment of units mounted on a carrier 601, where the pickers 100 are staggered to account for narrow row spacing.

Figure 13:
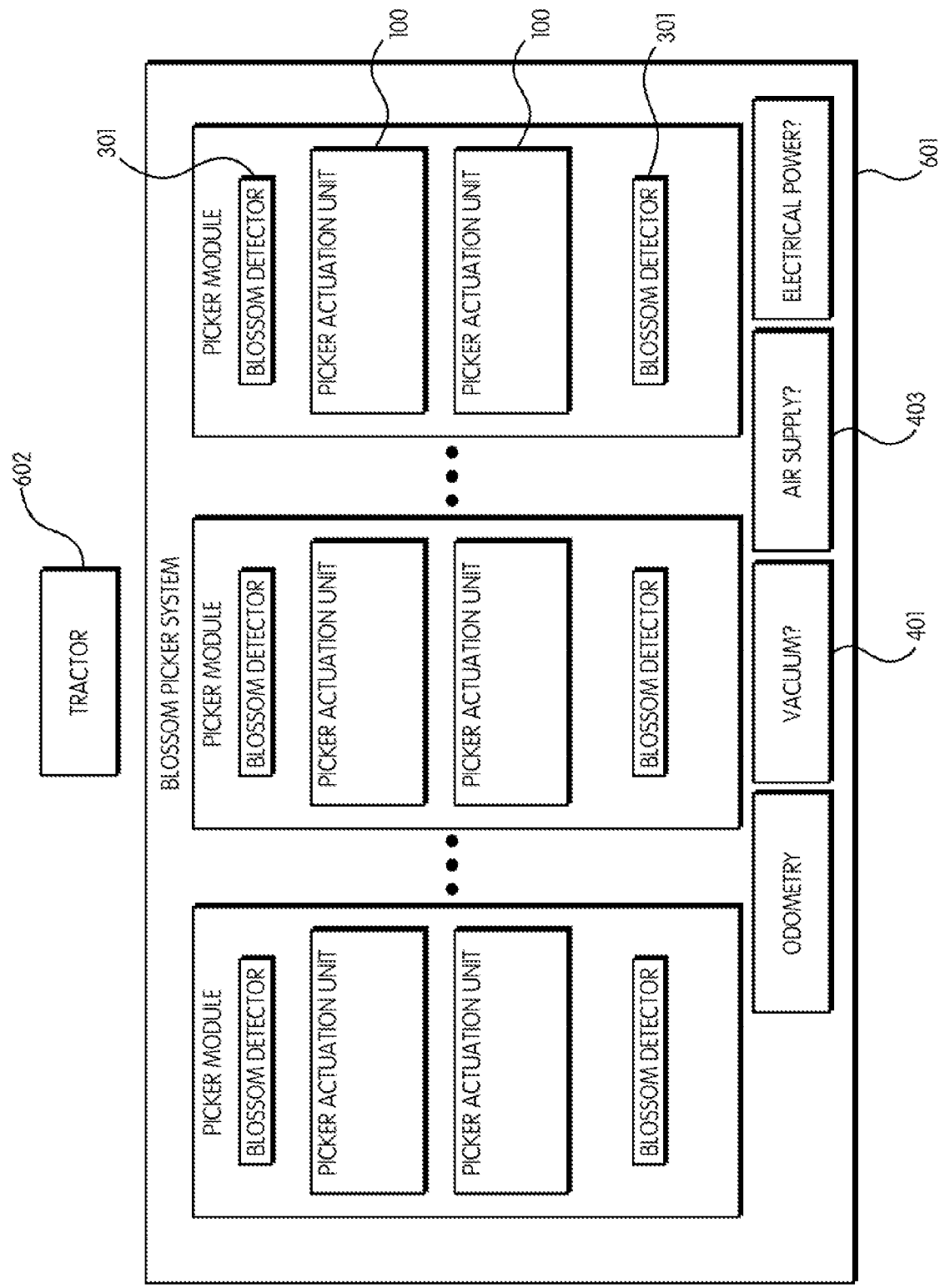
FIG. 13 shows a device with multiple modular units on a carrier, according to an alternative embodiment.
Figure 14:
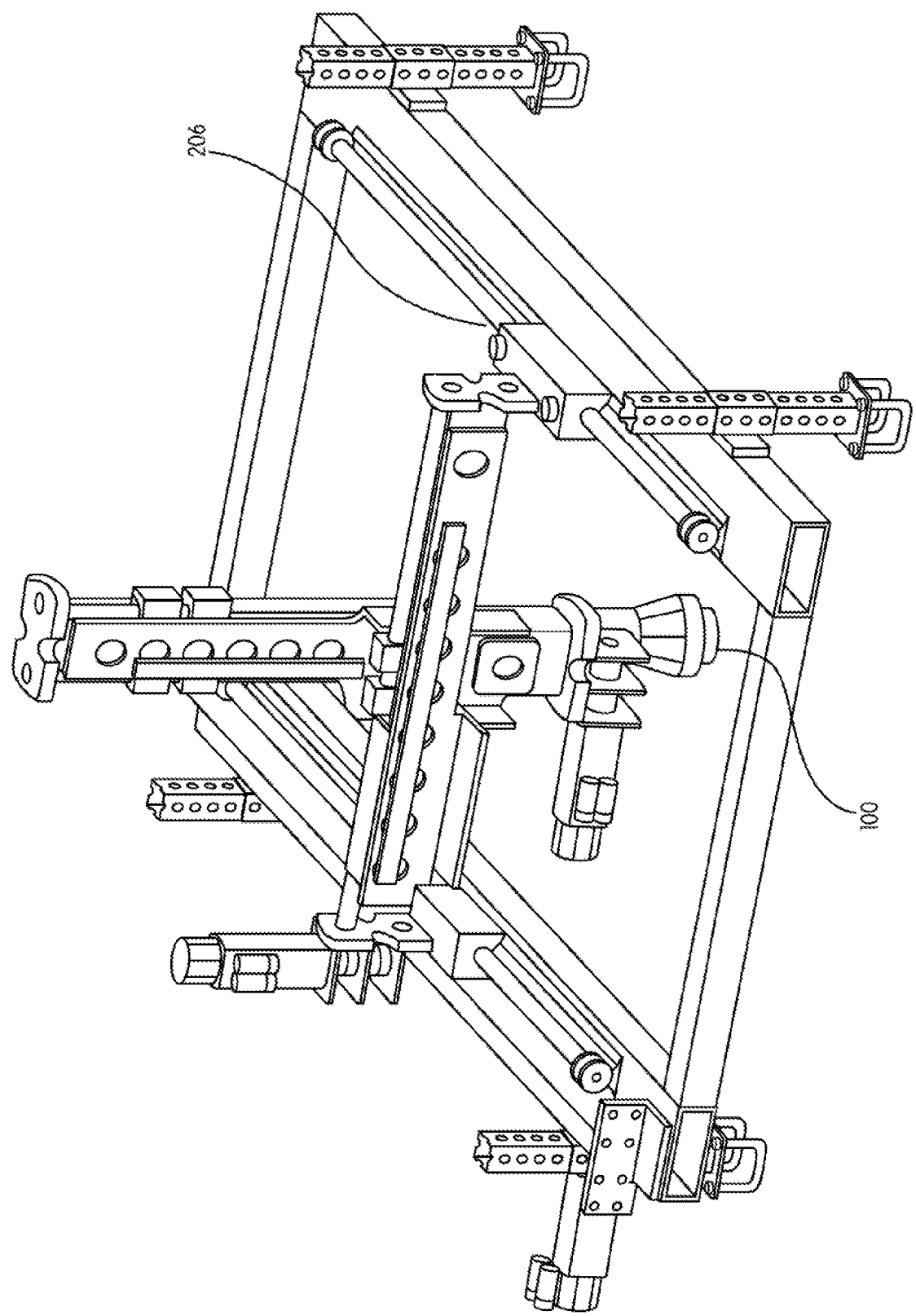
FIG. 14 shows the cutter mounted in an alternative embodiment.

FIG. 13 shows an alternate embodiment of the present invention. In this embodiment, the picker 100 is mounted on a set of rails 206 positioned orthogonally to each other (as further shown in FIG. 14). Thus, the picker 100 is capable of moving up-field/downfield along one rail 206, and side-to-side on the other rail 206. This embodiment provides an additional degree of freedom of travel for the picker 100 compared to the pivotally mounted arm 201. As such, this embodiment may be useful in applications where increased accuracy is desired. However, the increased accuracy is at the expense of increased complexity and slower movement.

Figure 15:
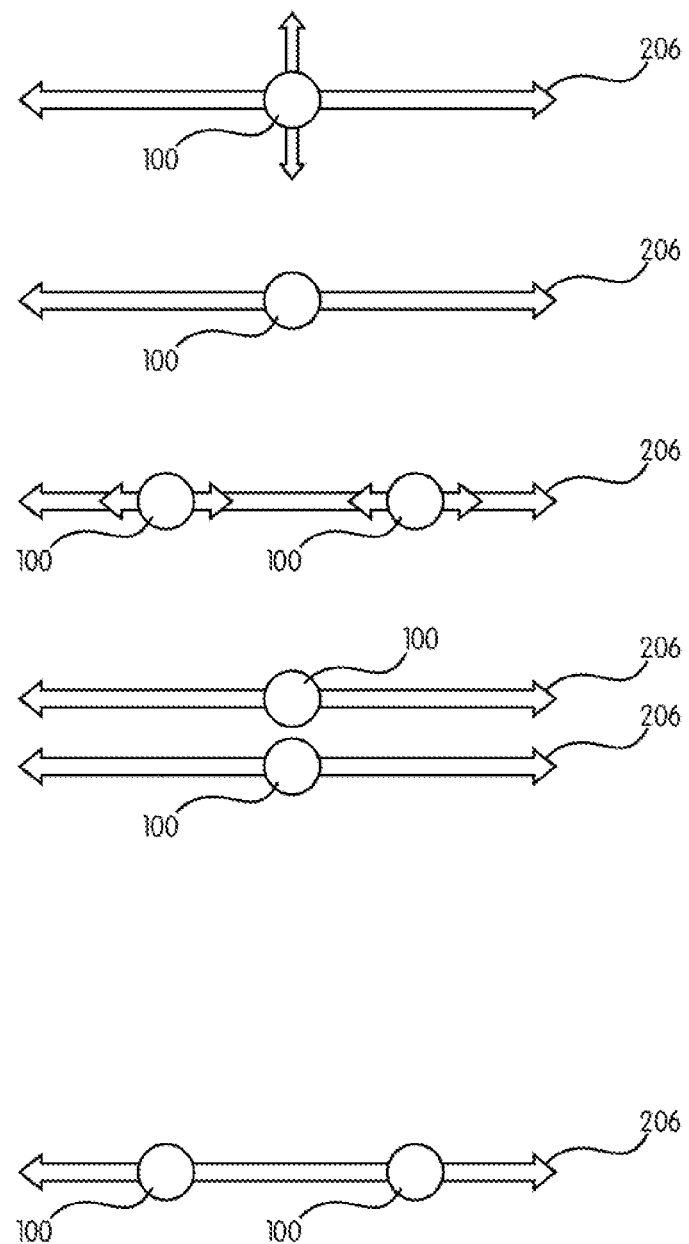
FIG. 15 shows multiple configurations of cutters according to an alternative embodiment.

FIG. 15 shows alternative configurations of the rail-based embodiment. In these embodiments, a single picker 100 can be mounted on two rails 206, providing movement in the X-Y directions. Other configurations show a single picker 100 on a single rail 206; multiple pickers 100 on a single rail 206; single picker 100 a rail 206 with multiple rails 206; and a fixed array of pickers 100.

Figure 16:
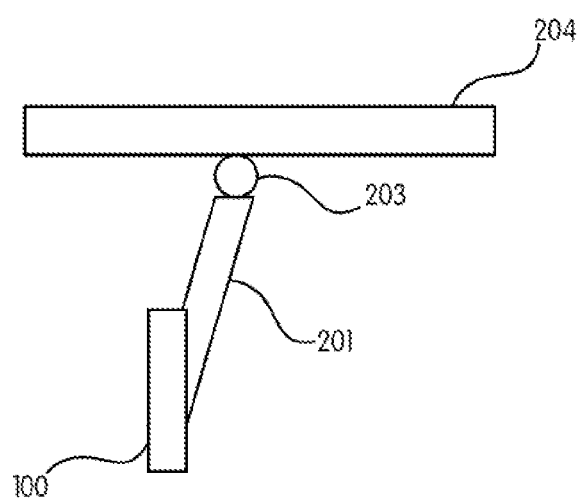
FIG. 16 shows the device according to an alternative embodiment.

FIG. 16 shows an alternative embodiment where the arm 201 is mounted to a joint 203 having its axis of rotation parallel to the direction of travel. With this configuration, the arm 201 hands vertically and swings from side to side like a pendulum. To maintain the picker 100 in a vertical direction, which allows for actuation of the extension 103 in a purely vertical direction rather than a diagonal one, a second joint can be placed at the junction between the arm 201 and the picker 100. The joint 203 can also be rotated 180 degrees, so that the motion of the picker 100 is from front to back.

Figure 23:
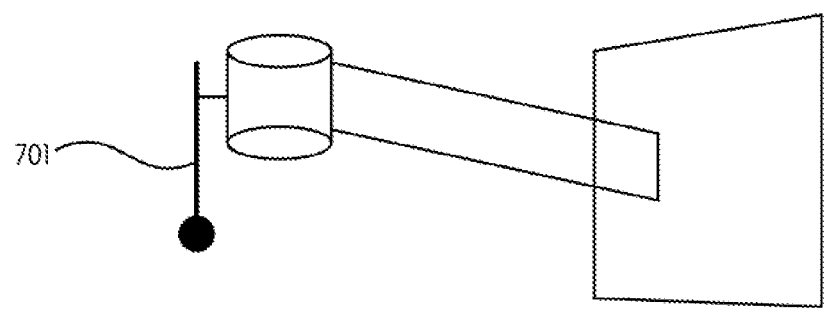
FIG. 23 shows an alternative embodiment used for depressing plant runners.

In yet another alternative embodiment, the blades 102 are replaced by a blunt protrusion 701, or plunger, that can be used to depress parts of the plant into the soil. In the embodiment shown in FIG. 23, the protrusion 701 is positioned adjacent to the cutter 101. For example, some plants propagate with runners (i.e. stolons) that spread outward from the base of the plant. Daughter plants can form from nodes on the runner, which are capable of growing roots. To expedite this process, nurseries will press the node into the soil to allow for root development. Like blossom removal, this process is typically done manually. However, by placing a blunt protrusion 701 on the end of the extension 103, the device can locate and depress the runner.

In field operation, the device identifies and locates a blossom, inflorescence, or fruit using the vision system 301, positions the picker 100 using commands from the embedded controller 300, and removes the blossom using the cutter 101. These actions are performed in real-time as the device moves across the field, whether under its own power or as it is transported by a vehicle 602. The arm 201 allows the picker 100 to move from side-to-side as the blossoms are encountered. For example, a first blossom may be positioned on the left side of the device. After removing the first blossom and as the device moves down the field, a second blossom may be encountered on the right side. The embedded controller 300, using position data about the arm 201 from the encoder 304 and the location data from the vision system 301, sends commands to the motor 202. The motor 202, in turn, moves the picker 100 from the left side to the right side. Once positioned properly on the right side, the actuator 104 extends the cutter 101, the blossom is drawn into the cutter 101 by the vacuum, and the blades 102 cut the blossom from the plant. The vacuum then draws the severed blossom through the vacuum conduit 402 for storage. This process is repeated as the device travels down the field.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A device for removing inflorescence from a field-grown plant comprising:
    a picker comprising at least one cutter movable side-to-side in a horizontal plane relative to a forward direction of the device traversing a field;
    a machine vision system comprising:
        an image capture device for capturing image data of at least one plant, and
        a machine vision module capable of identifying the inflorescence in the image data; and
    a controller comprising a planning module that determines a pre-determined path for the cutter to optimize inflorescence removal when multiple inflorescences are identified in the image data,
        wherein the controller receives a location of the inflorescence from the machine vision system,
        wherein the controller coordinates a movement of the picker to the location accounting for a speed of the device as the device traverses the field, the location of the inflorescence, and a maximum acceleration of the picker, and
        wherein the controller actuates the cutter to remove at least a portion of the inflorescence.

2. The device of claim 1, further comprising:
    an arm having a first end and a second end,
        wherein the first end attaches to the picker, and
        wherein the second end attaches to a pivoting joint;
    a base for supporting the pivoting joint; and
    a motor connected to the arm capable of causing a pivoting motion of the arm.

3. The device of claim 2, further comprising:
    a position encoder that provides a signal comprising a position of the arm to the controller.

4. The device of claim 1, wherein the picker further comprises:
    an extension having a first end and a second end, wherein the cutter is attached to the first end; and
    an actuator to move the extension in a vertical direction, wherein the actuator receives a signal from the controller.

5. The device of claim 4, further comprising:
    a vacuum conduit attached to the second end of the extension, and
    a vacuum source connected to the vacuum conduit, wherein the vacuum source provides a vacuum pressure within the cutter.

6. The device of claim 1, wherein the cutter comprises:
    at least one blade; and
    an actuator for engaging the blade, wherein the actuator receives a signal from the controller.

7. The device of claim 1, wherein the cutter comprises:
    a pair of curved blades mounted on a common axis of rotation,
    an actuator for engaging the pair of curved blades, wherein the actuator receives a signal from the controller and causes the blades to rotate on an axis and overlap in a cutting motion.

8. The device of claim 6, wherein the cutter further comprises:
    a plurality of flat blades arranged on a common plane forming a center opening defined by an edge of the plurality of blades, wherein the actuator causes at least one blade of the plurality of blades to move towards the center opening, causing a cutting motion where the blades intersect.

9. The device of claim 1, further comprising a second machine vision system for identifying if the inflorescence has been removed.

10. The device of claim 1, further comprising a translucent shroud surrounding at least one of the plant, the picker, and the machine vision system.

11. The device of claim 1, wherein the inflorescence comprises a fruit.

12. The device of claim 1, further comprising a spray nozzle to spray the cutter with at least one of a fungicide, herbicide, or lubricant.

13. The device of claim 2, further comprising:
    a second joint having a common axis with the pivoting joint, wherein the second joint is disposed on the arm between the first end and the second end; and
    an actuator to control a motion of the second joint.

14. The device of claim 1, further comprising a linkage assembly having a first end connected to the picker and a second end connected to a base,
    wherein the linkage assembly causes motion of the picker in a horizontal plane and a vertical plane in response to a signal from the controller.

15. The device of claim 1, wherein the image data comprises appearance data and depth data.

16. The device of claim 1, further comprising a lighting system to illuminate the plant.

17. The device of claim 1, wherein the device is self-propelled.

18. The device of claim 1, wherein the device is towed by a vehicle.

* * * * *